United States Patent [19]

Kingsford et al.

[11] Patent Number: 5,652,391
[45] Date of Patent: Jul. 29, 1997

[54] DOUBLE-DIAPHRAGM GAUGE PROTECTOR

[75] Inventors: Kenji A. Kingsford, Devore; Anthony K. Chan, San Gabriel, both of Calif.

[73] Assignee: Furon Company, Laguna Niguel

[21] Appl. No.: 440,198

[22] Filed: May 12, 1995

[51] Int. Cl.⁶ .................................................. G01L 7/00
[52] U.S. Cl. .................................................. 73/706; 73/715
[58] Field of Search ............................. 73/706, 715, 716; 92/40, 50, 96, 97

[56] References Cited

U.S. PATENT DOCUMENTS

| 37,794 | 2/1863 | Shaw | 73/715 |
|---|---|---|---|
| 151,367 | 5/1874 | Eils | 73/715 |
| 1,371,242 | 3/1921 | Hopwood | 92/97 |
| 2,667,184 | 10/1954 | Hailer et al. | 73/706 X |
| 2,883,995 | 4/1959 | Bialous et al. | 73/706 |
| 3,482,449 | 12/1969 | Werner | 73/406 |
| 3,803,917 | 4/1974 | Reese et al. | 73/716 |
| 4,343,188 | 8/1982 | Baker | 73/706 |
| 4,364,386 | 12/1982 | Jenkins et al. | 73/715 X |
| 4,382,377 | 5/1983 | Kleinschmidt et al. | 73/35 |
| 4,920,972 | 5/1990 | Frank et al. | 73/706 X |
| 5,115,676 | 5/1992 | Lee | 73/706 |

FOREIGN PATENT DOCUMENTS

| 66584 | 4/1957 | France | 73/706 |
|---|---|---|---|
| 59-153140 | 9/1984 | Japan | 73/715 |
| 1527531A | 12/1989 | U.S.S.R. | 73/706 |
| 692278 | 6/1953 | United Kingdom | 92/49 |

*Primary Examiner*—George M. Dombroske
*Assistant Examiner*—Paul D. Amrozowicz
*Attorney, Agent, or Firm*—Christie, Parker & Hale, LLP

[57] ABSTRACT

A double-diaphragm gauge protector constructed according to principles of this invention comprises a diaphragm housing formed from a upper housing body, a lower housing body, and a central housing body interconnected between the upper and lower housing bodies. A first diaphragm is disposed within the upper housing body forming an upper chamber therebetween and a liquid pressure-transfer medium is disposed within the upper chamber. The first diaphragm includes a transfer pad that projects outwardly away from a frontside or downwardly facing bottom surface of the first diaphragm toward the lower housing body. A second diaphragm is disposed within the lower housing body forming a lower chamber therebetween. The second diaphragm also includes a transfer pad that projects outwardly away from a frontside or upwardly facing top surface of the second diaphragm toward the first diaphragm. The transfer pads of the first and second diaphragms are positioned one on top of the other. A freely-floating spacer is disposed within the central housing body and is interposed between the bottom and top surfaces of the first and second diaphragms, respectively. The transfer pads of the first and second diaphragms are disposed within a central opening in the spacer.

30 Claims, 4 Drawing Sheets

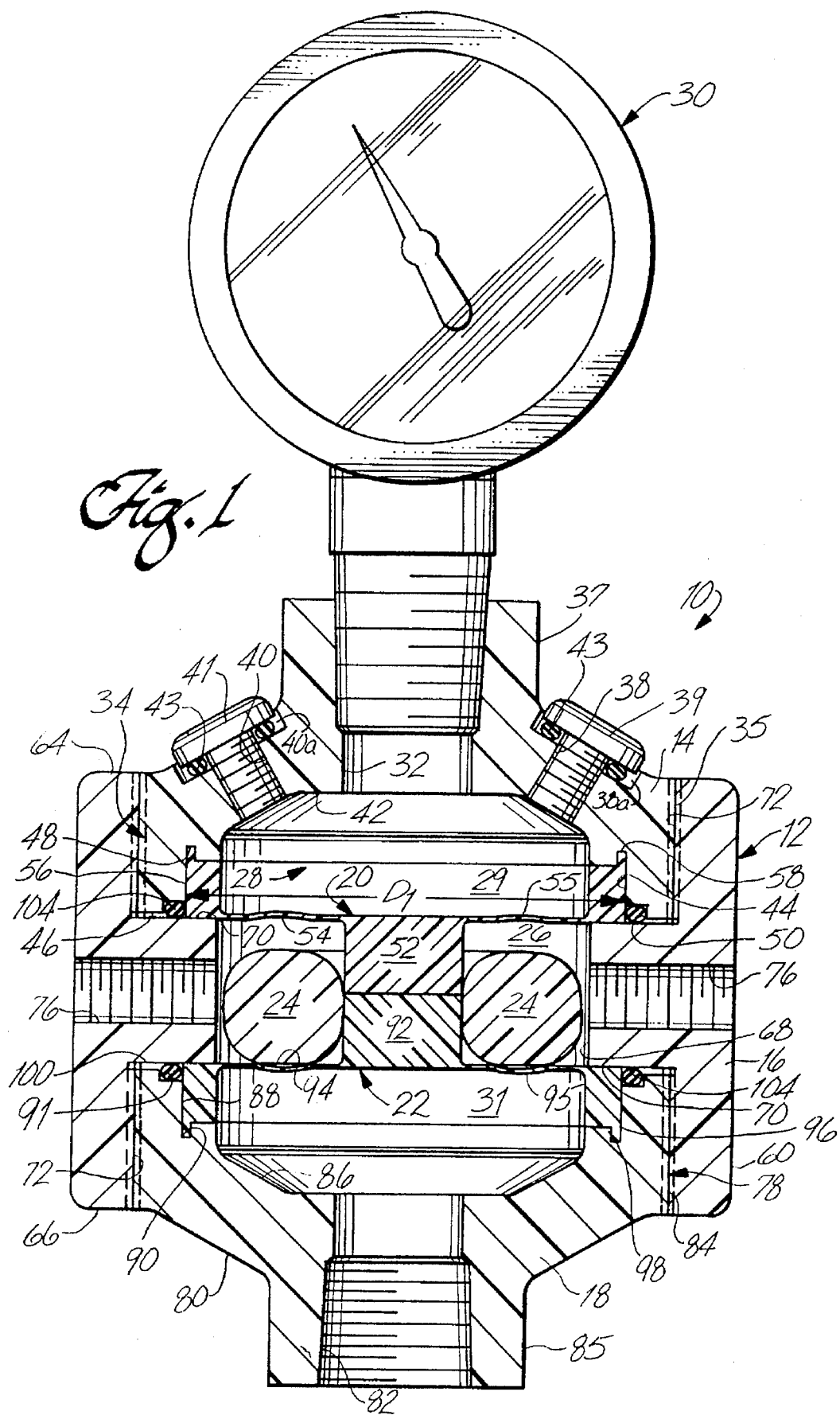

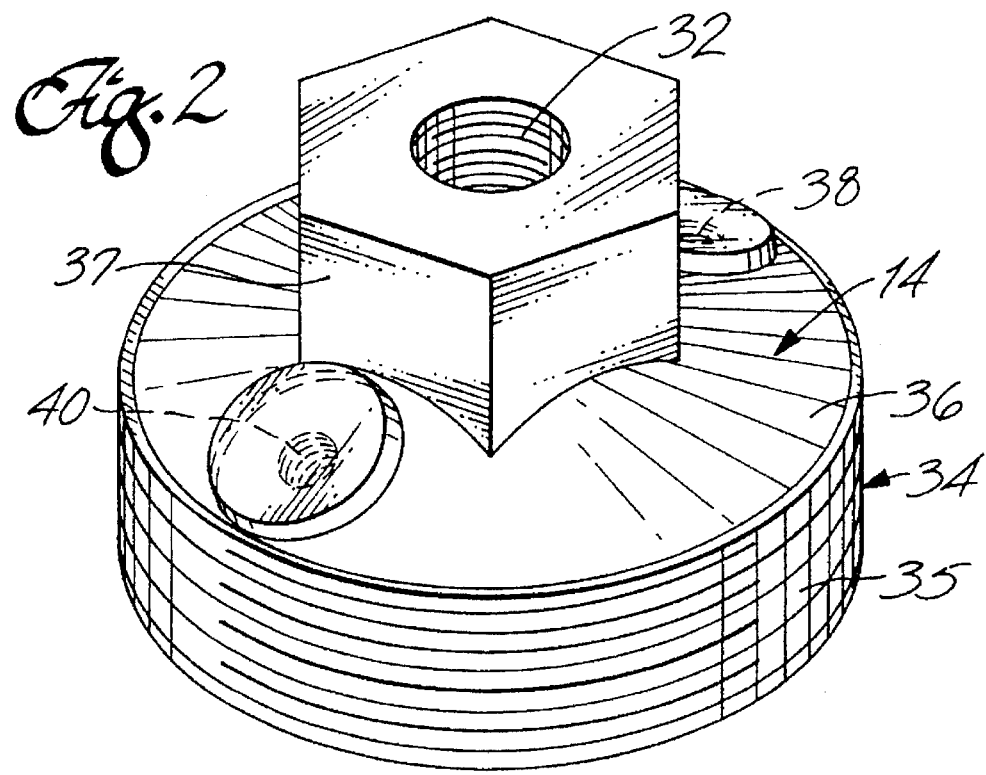
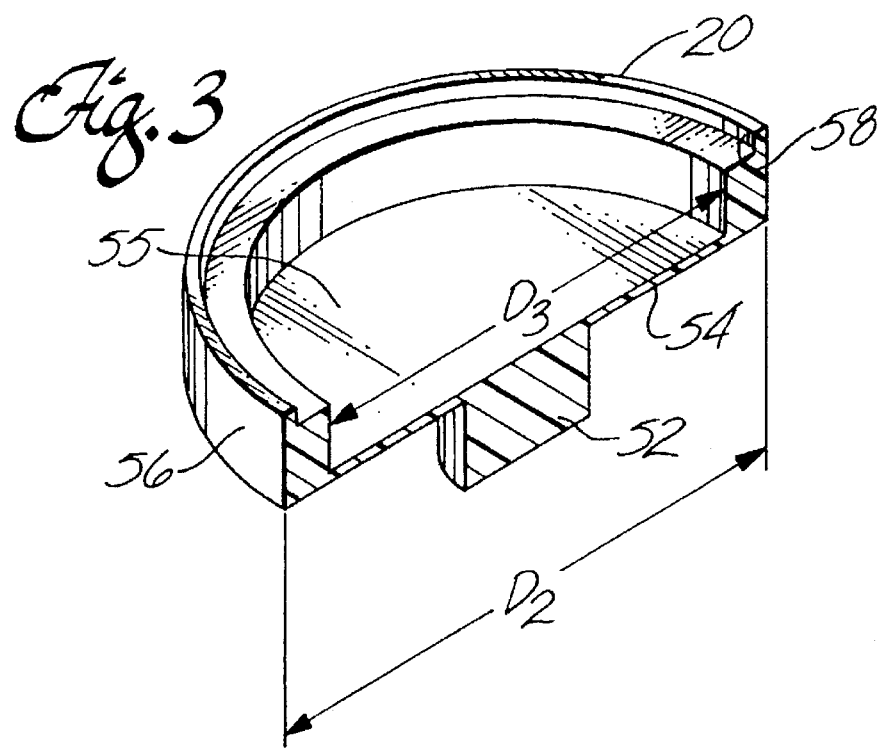

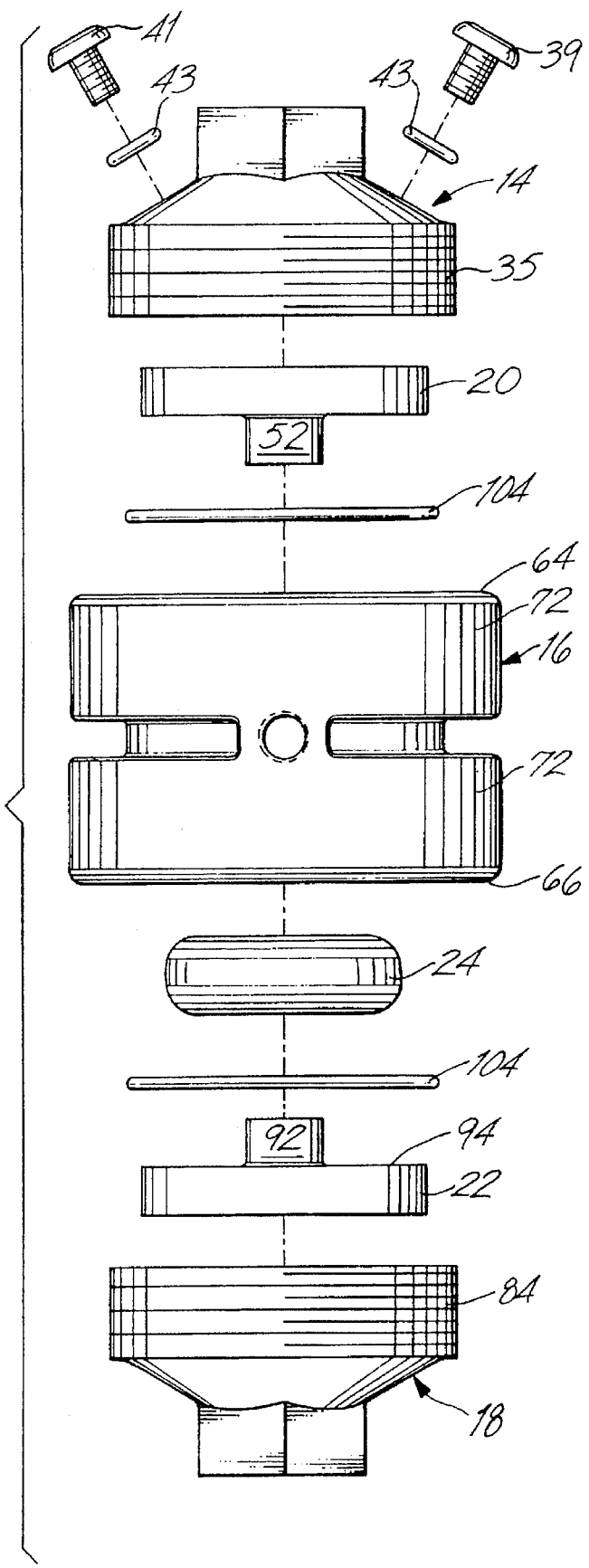

DOUBLE-DIAPHRAGM GAUGE PROTECTOR

FIELD OF THE INVENTION

The present invention relates generally to an apparatus inserted between a process fluid handling device and a pressure gauge to protect the pressure gauge against the potentially harmful effects of the process fluid transported through the line.

BACKGROUND OF THE INVENTION

Pressure gauges are used in manufacturing processes, such as in the semiconductor manufacturing industry, to indicate the pressure of liquids or gases contained within fluid or gas handling devices, such as pipes, heat exchanges, pumps and the like. Such pressure gauges are commonly coupled to pressure gauge protection which separate the process fluid from the gauge. Pressure gauge protection generally comprise a diaphragm-type housing that is attached at one end to a nipple or fitting on the fluid handling device and at its other end to the pressure gauge. The diaphragm housing conventionally includes an inlet opening at one end that is attached to the pipe fitting and which permits the passage of process fluid into the housing. A diaphragm is disposed with the housing and defines two chambers within the housing, a first chamber extending from the inlet opening to one surface of the diaphragm, and a second chamber extending from a gauge end of the housing to an opposite surface of the diaphragm. A liquid pressure transfer medium, such as distilled water and the like, is typically contained in the second chamber between the diaphragm surface and a pressure gauge connected to the housing gauge end.

Process fluid leaving the pipe and entering the inlet opening contacts the surface of the diaphragm, causing the diaphragm to move in a direction towards the gauge end. Movement of the diaphragm in response to the process fluid acting on it causes a pressure to be exerted by the opposite diaphragm surface to pressurize the liquid pressure transfer medium, which pressure is indicated by the pressure gauge. A diaphragm-type gauge protector constructed in this manner serves to protect the pressure gauge from the potentially harmful effects of caustic or corrosive process chemicals.

However, the above-described single diaphragm-type gauge protector has certain deficiencies. The use of a single diaphragm construction provides a relatively accurate pressure transfer from the process fluid to the liquid pressure transfer medium at lower pressures, where unwanted deformation of the diaphragm is unlikely, i.e., deformation of the diaphragm which does not result in equivalent pressure transfer to the liquid pressure transfer medium.

Additionally, the above-described diaphragm-type gauge protector which uses water as a transfer medium cannot be used in applications where the process fluid temperature is greater than or equal to about 100° C., i.e., at or above the boiling point of water. When process fluid at or above 100° C. enters the gauge protector housing, the temperature of the water rises to its boiling point. This introduces vapor bubbles into the pressure transfer medium which causes inaccuracies in the indicated pressure due to the compressibility of the bubbles. Additionally, heating the water pressure transfer medium to above its boiling point results in a dramatic increase in the volume of the transfer medium which could cause diaphragm to rupture, thereby placing the pressure gauge in contact with potentially corrosive or caustic process chemicals. Rupturing of the diaphragm could also introduce the liquid pressure transfer medium into the process fluid, thereby, contaminating the fluid or gas processing system and, thereby, possibly causing damage to the particular product being manufactured, e.g., a large number of semiconductor chips.

Process fluids that are typically used in semiconductor manufacturing include either strong acids or strong bases that are elevated to temperatures near their boiling point to increase their effectiveness in an etching process. To accommodate use in such high-temperature applications single diaphragm-type gauge protectors have been modified by replacing the water pressure transfer medium with a higher boiling point liquid, such as oil and the like. Although application of the above-described diaphragm-type gauge protecting apparatus, comprising a high boiling point liquid pressure transfer medium, permits such apparatus to be used without the possibility of boiling the liquid pressure transfer medium, the use of the gauge protector in such an application places the diaphragm in contact with such chemicals at elevated temperatures. Placing the diaphragm in direct contact with such chemicals and under such conditions increases the likelihood of diaphragm rupture by both chemical attack and by mechanical thermally related failure. A diaphragm rupture in such an application may cause damage to the pressure gauge by exposure of the gauge to the corrosive chemicals, and may cause danger to the surrounding environment or a heath risk to nearby operators if the process liquid is allowed to exit the gauge protector and enter the environment.

Additionally, in the process of manufacturing semiconductors, it is desired that the chemicals used in the manufacturing process be of high purity to ensure that the manufactured product, a semiconductor chip, be without defects. A diaphragm rupture in such application could, therefore, cause the liquid pressure transfer medium, e.g., oil, to enter the process handling system and contaminate the process chemicals, the process handling devices, and semiconductors manufactured using such contaminated process chemicals. Accordingly, potential damage caused from such a diaphragm rupture could be quite costly. It is, therefore, desirable that a gauge protector be constructed that will facilitate accurate process pressure monitoring under conditions of both low and high pressure and of high temperature. It is desirable that a gauge protector be constructed in a manner that will eliminate the potential for pressure gauge damage or fluid handling system contamination caused by diaphragm rupture in high-temperature applications. It is also desirable that the gauge protector be constructed using conventional manufacturing methods from conventional and available materials.

SUMMARY OF THE INVENTION

There is, therefore, provided in the practice of this invention a double-diaphragm gauge protector that facilitates accurate process pressure monitoring under conditions of high pressure and high temperature, and is constructed in a manner that eliminates the possibility of process system contamination by gauge protector failure. A double-diaphragm gauge protector constructed according to principles of this invention comprises a diaphragm housing formed from: (1) a separate upper housing body comprising a pressure outlet port extending though a body wall for accommodating connection with a pressure measuring or sensing device; (2) a lower housing body having a process fluid or gas inlet port through a body wall for accommodating connection with a fluid or gas handling device; and (3) central housing body having an annular passage therethrough, wherein the central housing is interconnected between the upper and lower housing bodies.

A first diaphragm is disposed within the upper housing body, forming an upper chamber therebetween. A liquid pressure-transfer medium is disposed within the upper chamber. The first diaphragm includes a transfer pad that projects outwardly away from a frontside or downwardly facing bottom surface of the first diaphragm toward the lower housing body. A second diaphragm is disposed within the lower housing body, forming a lower chamber therebetween. The second diaphragm also includes a transfer pad that projects outwardly away from a frontside or upwardly facing top surface of the second diaphragm toward the first diaphragm. The transfer pads of the first and second diaphragms are positioned one on top of the other.

A freely-floating spacer is disposed within a central chamber formed within the central housing body between the upper and lower housing bodies. The spacer is interposed between the bottom and top surfaces of the first and second diaphragms, respectively. Transfer pads of the first and second diaphragms are disposed within a central opening in the spacer.

When the gauge protector is not in use, the transfer pads just contact one another and the spacer is not in simultaneous contact with the bottom and top surfaces of both first and second diaphragms, respectively. When the gauge protector is in use, the transfer pads are in contact within one another and the spacer is in simultaneous contact with the bottom and top surfaces of both first and second diaphragms, respectively, to facilitate the transfer of pressure induced movement between the second and first diaphragms. Movement of the first diaphragm pressurizes the liquid pressure transfer medium, which pressure is detected by the pressure measuring of sensing device.

BRIEF DESCRIPTION OF THE DRAWINGS

These and other features and advantages of the present invention will become appreciated as the same becomes better understood with reference to the specification, claims and drawings wherein:

FIG. 1 is a semi-schematic cross-sectional side elevational view of one embodiment of a gauge protector constructed according to principles of this invention comprising an upper housing body, a lower body housing, a central housing body, first and second diaphragm, an a spacer located between the diaphragms;

FIG. 2 is a semi-schematic perspective view of the upper housing body portion of the gauge protector of FIG. 1;

FIG. 3 is a semi-schematic perspective view shown in cross section of the first diaphragm of the gauge protector of FIG. 1;

FIG. 6 is an exploded side elevational view of the gauge protector of FIG. 1.

DETAILED DESCRIPTION

Figure 4:
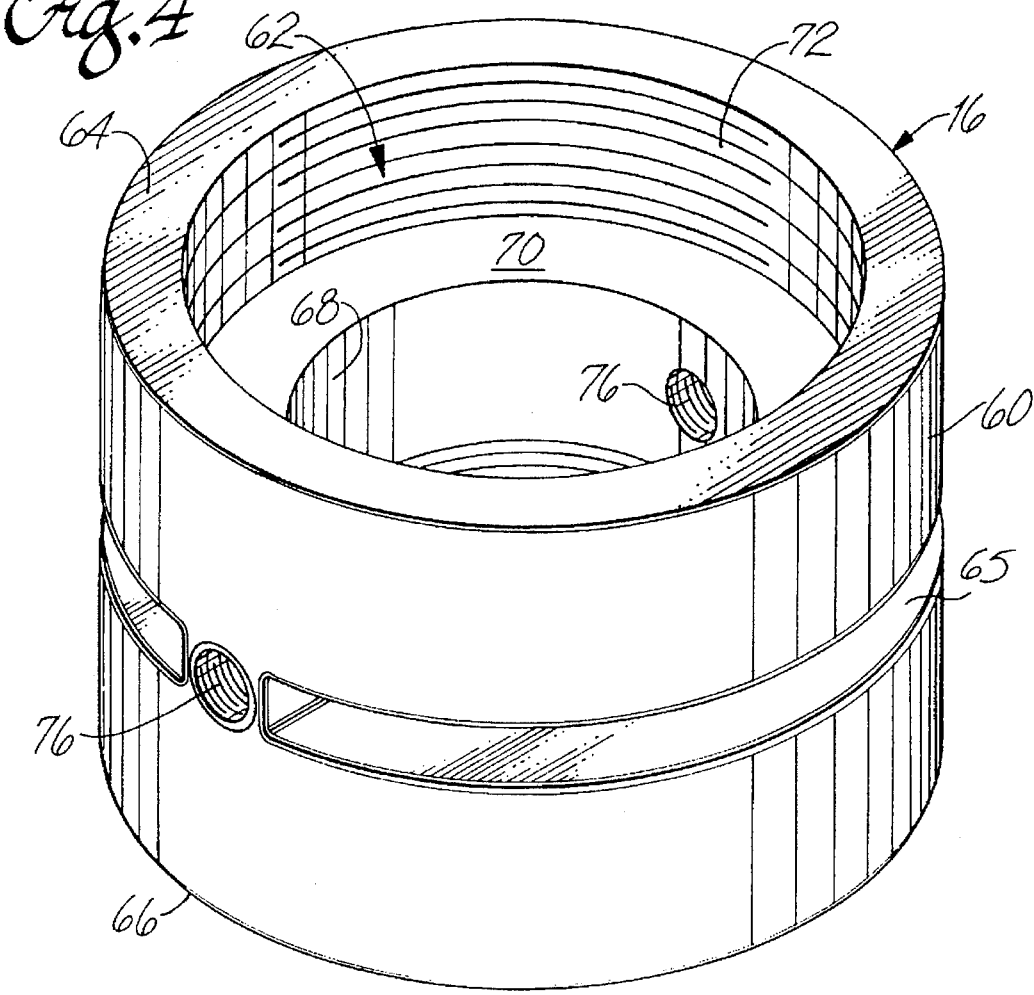
FIG. 4 is a semi-schematic perspective view of the central housing body portion of the gauge protector of FIG. 1.

Referring to FIG. 1, there is shown a double-diaphragm gauge protector 10 constructed according to principles of this invention for purposes of protecting a pressure gauge, pressure transducer or other type of pressure measuring or sensing device from the potentially harmful effects of process fluids disposed within a fluid handling system, e.g., within a pipe, a heat exchanger, a pump or the like. The positioning and orientation of the components of the gauge protector 10 relative to each other is described below as they are shown in FIG. 1. The double-diaphragm gauge protector 10 facilitates accurate pressure indication at high temperatures, and substantially reduces or eliminates the possibility of diaphragm rupture and the resulting contamination of the process handling system and the resulting products being manufactured.

The gauge protector 10 of the illustrated embodiment comprises a diaphragm housing 12 having separate upper, central, and lower bodies 14, 16 and 18, respectively, which are assembled together as a unit. The upper and lower housing bodies are threadably connected to opposite ends of the central housing body. The upper housing body 14 comprises a first diaphragm 20 mounted therein extending across the interior space between the upper housing body and the central body. The upper, central and lower housings are hollow and upon assembly define a hollow interior space which, as is disclosed below, is divided into three chambers by a pair of vertically spaced-apart diaphragms. The lower housing body 18 has a second diaphragm 22 mounted therein extending across the open space between the central body and the lower housing. A donut-shaped spacer 24 is disposed within a central chamber 26 formed between adjacent surface portions of the first and second diaphragms 20 and 22. A liquid pressure-transfer medium 28 is disposed in an upper chamber 29 defined by the upper housing body 14 and the first diaphragm 20. A pressure gauge 30, pressure sensing device and the like is connected to a pressure outlet port 32 of the upper housing body 14.

Process fluid entering a lower chamber 31 of the housing 12, defined by the lower housing body 18 and the second diaphragm 22, exerts a pressure on the second diaphragm 22 which is transferred to the first diaphragm 20, which in turn imposes a pressure on the liquid pressure-transfer medium 28, proportional to the process pressure, that is transmitted to the pressure measuring or sensing device 30. It is desired that the gauge protector pressurizes the liquid pressure-transfer medium to a pressure approximately equal to that of the pressure of the process fluid. For example, in one embodiment the gauge protector pressurizes the liquid pressure-transfer medium to about 95 percent of the process fluid pressure.

The diaphragm housing bodies 14, 16 and 18 can be formed by conventional machining or molding processes and can be made from hard materials capable for providing a rigid structure for mounting to a process handling device and accommodating attachment with a pressure measuring device. It is desired that the housing bodies 14, 16 and 18 be made from a chemically resistant structural material that is additionally capable of withstanding elevated temperatures, such as stainless steel, steel alloy, and various forms of fluoropolymeric compounds such as polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) and the like. A particularly preferred method of forming the housing bodies 14, 16 and 18 is by injection molding and a particularly preferred material for forming the housing bodies is PFA.

Referring to FIGS. 1 and 2, in an exemplary embodiment the upper housing body 14 is configured having a generally cylindrical sidewall 34 and a dome-shaped top 36 extending from the sidewall to the pressure outlet port 32, which is centrally positioned at a topmost portion of the upper housing body 14. The pressure outlet port 32 extends through the topmost body wall of the upper housing body 14 and is configured to facilitate connection with an inlet fitting of a pressure measuring or sensing device 30, such as a conventional pressure gauge or pressure transducer.

An outer surface 35 of the upper body sidewall 34 is configured to accommodate connection within a complementary portion of the central housing body 16. In a preferred embodiment, as best shown in FIG. 2, the outer surface 35 is threaded, having a 1.875 inch by 10 buttress thread pattern, to accommodate threadable connection with a complementary threaded portion of the central housing body 16. Additionally, the top 36 of the upper housing body has an hexagonal-shaped projection 37 extending outwardly along an outer surface of the pressure outlet port 32 to facilitate both threaded installation of the upper housing body with the central housing body 16, and threaded installation of a desired pressure measuring or sensing device 30 with the pressure outlet port 32.

The upper housing body 14 incorporates a bleeder port 38 and a filler port 40 that each extend through the body wall of the dome-shaped top 36. The bleeder and filler ports 38 and 40 are oriented at diametrically opposite locations of the upper body, but may be oriented differently if desired. Additionally, if desired a single multi-purpose port can be used rather than separate ports to facilitate filling and bleeding operations described in greater detail below. The bleeder and filler ports are threaded to accommodate threadable engagement with a respective bleeder plug 39 and filler plug 41. As seen in FIG. 1, an O-ring seal 43 is interposed between each bleeder and filler plug and recessed surface portions 38a and 40a of respective bleeder and filler ports to provide an air and liquid-tight seal therebetween. Suitable materials for forming the O-ring seal 43 include rubber, polymeric materials, rubber coated with polymeric material, and the like. A particularly preferred O-ring material is Viton.

The upper housing body 14 comprises a concave inner structure 42 defined by the sidewall and dome-shaped top portions 34 and 36, respectively. The inner structure 42 includes a recessed portion or counterbore 44 that extends circumferentially around the bottom most portion of the inside surface of the sidewall 34. The recessed portion 44 has a diameter $D_1$ and extends axially along the sidewall 34 a distance near an open end 46 of the upper housing body 14. The recessed portion 44 includes a groove 48 that extends circumferentially within the recessed portion. The groove is directed axially a distance towards the topmost portion of the upper housing body 14. The inner structure 42 also includes a second recessed portion or second counterbore 50 concentric with the recessed portion 44 that extends circumferentially around an inside surface of the sidewall 34. The second recessed portion 50 has a diameter greater than the recessed portion 44 and extends from an edge of the recessed portion 44 to the open end 46 of the upper housing body.

In a preferred embodiment, the upper housing body 14 comprises a recessed portion 44 having a diameter $D_1$ of approximately 1.5 inches and extending axially a distance of approximately 0.14 inches within the inner structure 42, a groove 48 extending axially a distance of approximately 0.05 inches and having a groove width of approximately 0.03 inches, a second recessed portion 50 having a diameter of approximately 1.650 inches and extending axially a distance of approximately 0.04 inches within the inner structure 42, bleeder and filler ports 38 and 40 having a diameter of approximately 0.25 inches, and a pressure outlet port having a diameter of approximately 0.33 inches that is threaded to accommodate connection with a pressure measuring or sensing device.

Referring to FIGS. 1 and 3, in an exemplary embodiment, the first diaphragm 20 has a generally circular shape and is formed from a resilient material which preferably displays good chemical and heat resistance. Suitable materials for forming the diaphragm 20 include those fluoropolymeric compounds previously described for forming the upper, central and lower housing bodies 14, 16 and 18, respectively. A preferred first diaphragm 20 is formed by machining it from PTFE. PTFE is preferred because a diaphragm formed from PTFE has a relatively long fatigue life. For example, the fatigue life of a PTFE diaphragm is ten times greater than a diaphragm formed from PFA.

The first diaphragm 20 includes a pressure transfer pad 52 that extends outwardly a distance away from a frontside or downwardly facing bottom surface 54 of the first diaphragm. In a preferred embodiment, the transfer pad 52 projects outwardly away from a central location of the frontside surface 54, has a generally cylindrical shape, is integral with the first diaphragm 20, and is formed from a solid piece of the material selected to form the diaphragm, e.g., PTFE.

The first diaphragm 20 has a cylindrical sidewall 56 that includes a tongue 58 that extends a distance axially around a peripheral portion of the sidewall 56. The sidewall 56 and tongue 58 are sized and shaped to fit within the recessed portion 44 and groove 48, respectively, of the upper housing body 14. The tongue 58 and groove 48 are sized to have interference fit of from about 0.005 to 0.01 for purposes of eliminating or minimizing any hold-up volume for unwanted accumulation of a pressure transfer medium therebetween. This is especially desirable in the case where the pressure transfer medium is water to prevent the formation of bacteria.

Referring particularly to FIG. 3, in a preferred embodiment, the first diaphragm 20 has a diameter $D_2$ of approximately 1.55 inches and a diameter $D_3$ of approximately 1.31 inches. The sidewall 56 of the preferred embodiment extends axially approximately 0.2 inches and has a thickness of approximately 0.12 inches. The tongue 58 extends axially approximately 0.045 inches and has a thickness of approximately 0.025 inches, while the surface 54 has a thickness in the range of from 0.008 to 0.012 inches. The transfer pad 52 of the illustrated embodiment extends approximately 0.25 inches from the diaphragm surface and has a diameter of approximately 0.4 inches.

It is desired that the diaphragm have a surface thickness in the range of from, about 0.008 to 0.012 inches because at a thickness greater than about 0.012 inches a diaphragm surface formed from PTFE displays an inherent resistance to deform, thereby interfering with the diaphragms ability to move freely and accurately transmit pressure movement. At a thickness less than about 0.008 a diaphragm surface formed from PTFE may not be thick enough to provide a desired degree of rupture protection.

The first diaphragm 20 is installed across the downwardly facing open end 46 of the upper housing body 14 by placing the sidewall 56 of the first diaphragm 20 into the recessed portion 44 of the upper body 14 so that the pressure transfer pad 52 is directed away from the upper body 14, and so that the tongue 58 is directed toward the groove 48. An upper chamber 29 is defined between a backside or upwardly facing top surface 55 of the first diaphragm 20 and the upper body inner structure 42.

The first diaphragm 20 is constructed having a diameter $D_2$ that is slightly larger than the diameter $D_1$ of the recessed portion so that a radially inwardly directed circumferential loading force is imposed onto the first diaphragm 20 by the recessed portion 44 upon placement therein. The circumferential loading force causes the first diaphragm 20 to take on a slightly waved or sine-curved shape, as best shown in FIG. 1. Circumferentially loading the first diaphragm is desired because it serves to counteract any tension forces that may act on the first diaphragm 20, caused by either inserting the first diaphragm into the upper body or by installing the upper body into the central housing body 16, as described below. Such circumferential loading maintains the diaphragm surface in a relaxed state when not is use.

It is desired that tension or stretching forces on the first diaphragm surface be avoided because such forces causes the diaphragm surface to resist being deformed in response to an imposed pressure and, therefore, impairs the first diaphragm's ability to accurately transfer pressure related movement to the liquid pressure-transfer medium 28. A diaphragm placed under a tension load precludes accurate pressure measurement.

Because of the differences in diameter between the first diaphragm sidewall 56 and the upper body recessed portion 44, a loading tool (not shown) may be used to facilitate diaphragm insertion. The loading tool is placed over an outside surface edge of the diaphragm adjacent the sidewall 56, and is used to drive the sidewall 56 into the recessed portion 44 and ensure proper alignment of the diaphragm during the process. With continued driving action, the loading tool facilitates placing the diaphragm sidewall 56 completely within the recessed portion 44 and installing the tongue 58 within the groove 48.

Referring now to FIGS. 1 and 4, in an exemplary embodiment, a central housing body 16 comprises a generally cylindrical sidewall 60 having an annular passage 62 extending therethrough from a first body end 64 to a second body end 66. The sidewall 60 comprises a centrally located groove 65, best shown in FIG. 4, that extends circumferentially around an outside sidewall surface. The groove 65 is desired when forming the central housing body 16 from PFA by a molding process because of the high heat transfer coefficient of such material and, therefore its tendency to cool off quickly during the molding process. It is, therefore, desirable that the central housing body 16 have a constant sectional area, i.e., a constant wall thickness, to avoid shrinkage related deformation that is known to occur in sectional areas having higher mass density. The groove 65 maintains a consistent wall thickness about the central housing body by reducing the mass density at a sectional area where the reduced diameter section is located. Accordingly, the presence of such groove is not intended to be limiting and may not be present if the central housing is formed by a process other than by injection molding, i.e., by machining process.

The annular passage 62 comprises a reduced diameter section 68 that is positioned at the center of the length of the passage 62 and extends axially along the passage a predetermined distance. Rim portions 70 extend radially inwardly from the sidewall 60 at opposite top and bottom sides of the reduced diameter section 68 to an inside diameter of the reduced diameter section. Generally cylindrical collars 72 formed from the sidewall 60 define the top and bottom portions of the annular passage 62 above and below the reduced diameter section 68. An inside surface of each collar is configured to accommodate connection with complementary portions of upper and lower housing bodies 14 and 18. In a preferred embodiment, the inside surface is threaded, having a 1.875 inch by 10 buttress threading pattern, to accommodate threadable connection with complementary threaded portions of the upper and lower housing bodies.

The reduced diameter section 68 has one or more bores 76 that extend radially through the sidewall 60 of the central housing body 16 and function as leak detection ports. The leak detection ports 76 may have wall portions configured a number of different ways to accommodate connection with various different types leak detection sensors or related devices that are described in greater detail below. In a preferred embodiment, the central body 16 comprises two leak detection ports 76 that are diametrically opposed from one another and are threaded to accommodate threaded engagement with a complementary leak detection device.

In a preferred embodiment, the central housing body 16 comprises a sidewall 60 having an outside diameter of approximately 2.25 inches and a length of approximately 1.5 inches. The collars 72 each have a diameter of approximately 1.875 inches and a length of approximately 0.5 inches, while the reduced diameter section 70 has a diameter of approximately 1.28 inches and an axial length or height of approximately 0.5 inches. The leak detection ports 76 have a diameter of approximately 0.25 inches.

Referring again the FIG. 1, the lower housing body 18 is configured in the same manner as that previously described for the upper housing body 14, comprising a generally cylindrical sidewall 78 and a dome-shaped bottom 80 extending from the sidewall portion. Because of the similarities between the upper and lower housing bodies, FIG. 2 may also be referred to for purposes of reference and illustration, noting the below described differences. The lower housing body 18 comprises a process fluid inlet port 82, which is centrally positioned at a bottom most portion of the bottom 80. The fluid inlet port 82 extends through a body wall of the lower housing body 18 and is configured to facilitate connection with an outlet fitting of a process gas or fluid handling device, such as a nipple extending from a pipeline.

Like the upper housing body, an outer surface 84 of the lower body sidewall 78 is configured to accommodate connection within a complementary portion of the central housing body 16, i.e., the lower collar 72. In a preferred embodiment, the outer surface 84 is threaded, having a 1.875 inch by 10 buttress thread pattern, to accommodate threadable connection with a complementary threaded portion of the central housing body 16. The lower housing body 18 also include a hexagonal-shaped projection 85 that extends a distance away from the bottom 80 of the lower body and defines an outer surface of the process fluid inlet port 82. Unlike the upper housing body, the lower housing body 18 does not comprise a bleeder port or a filler port.

Like the upper housing body, the lower housing body 18 comprises a concave inner structure 86 defined by the sidewall and dome-shaped bottom portions 78 and 80, respectively. The inner structure 86 comprises a recessed portion 88, a groove 90, and a second recessed portion 91 configured in the same manner and having the same dimensions, in a preferred embodiment, as the same elements previously described for the upper housing body.

Referring to FIG. 1, a second diaphragm 22 is configured the same as the first diaphragm 20. The diaphragm 22 comprises a transfer pad 92, a frontside or upwardly facing top surface 94, a backside or downwardly facing bottom surface 95, a sidewall 96, and a tongue 98. The sidewall 96 of the second diaphragm is sized and shaped to fit within the recessed portion 88 and groove 90 of the lower housing body 18. In a preferred embodiment, the second diaphragm has the same dimensions as that described above for a preferred embodiment of the first diaphragm and is also formed by machine process from PTFE.

The second diaphragm 22 is installed across the upwardly facing open end 100 of the lower housing body 18 in the same manner as was previously described for installation of the first diaphragm 20 into the upper housing body 14. Thus, a radially inwardly directed circumferential loading force is applied to the second diaphragm 22. When the gauge protector is fully assembled with the lower diaphragm in place, a lower chamber 31 is defined in the lower housing body between the second diaphragm backside surface 95 and the lower body inner structure 86.

Figure 5:
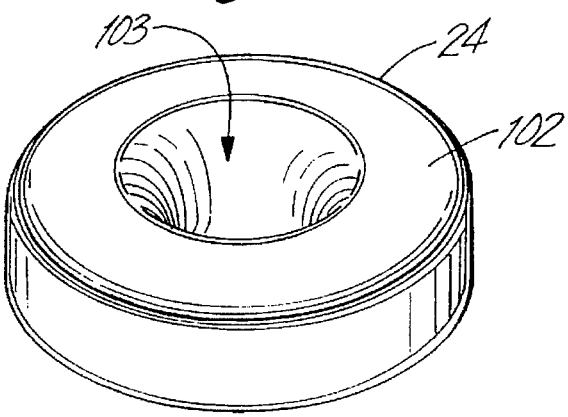
FIG. 5 is a semi-schematic perspective view of the spacer of the gauge protector of FIG. 1.

Referring to FIGS. 1 and 5, a spacer 24 comprises a donut-shaped body 102 with a central opening 103. In a preferred embodiment, the spacer body 102 has a cross section in the general shape of a square with rounded corners. Alternatively, the spacer body can be configured having a circular or rectangular cross section. The spacer 24 has an outside diameter smaller than the diameter of the reduced diameter section 68 of the central housing body 16, and has an inside diameter larger than the diameter of each first and second diaphragm transfer pad 52 and 92, to facilitate free-floating movement of the spacer within the central chamber 26 between the first and second diaphragms.

The spacer 24 can be formed from a structurally ridged material such as steel, steel alloys, polymeric materials such as fluoropolymeric compounds selected from the group consisting of polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), and polyvinyl fluoride (PVF), and the like.

It is desired that the material selected to form the spacer be resistant to heat induced deformation to ensure that the cross-sectional shape of spacer will be maintained during application of the double-diaphragm gauge protector in high temperature applications. It is important that the cross-sectional shape and dimension of the spacer remain constant in such high temperature applications to ensure accurate pressure transfer through the gauge protector and to the pressure measuring or sensing device. In a preferred embodiment, the spacer is formed by machining from solid PTFE. PTFE is a preferred material because it has a how coefficient of friction to ensure that the spacer will move freely without appreciable friction related restriction to movement within the gauge protector. This physical characteristic ensures that a spacer formed from PTFE provides accurate pressure transmission movement.

In a preferred embodiment, the spacer has an outside diameter of approximately 1.22 inches, an inside diameter of approximately 0.42 inches, and a generally square cross section of approximately 0.4 inches.

Referring now to FIGS. 1 and 6, the upper housing body 14 and first diaphragm 20 are assembled together to form a upper housing first diaphragm subassembly. The subassembly is then connected within the first end 64 of the central housing body 16 by threaded engagement between complementary threads on the outer surface 35 of the upper body sidewall 34 and on the threads on an inside surface of the upper central body collar 72. An O-ring seal 104 is interposed between the upper and central housing bodies 14 and 16 to ensure a fluid-tight seal. The O-ring seal may be made from a number of different materials such as rubber, fluoropolymeric compounds, rubber coated with fluoropolymeric compounds and the like. It is preferred that the O-ring seal material be both chemically and heat resistant. A particularly preferred O-ring seal material is Viton.

Referring particularly to FIG. 1, the O-ring seal 104 is housed on an upper body side within a the counterbore 50. The O-ring 104 is in contact, on the central body side, with a portion of the inwardly extending and upwardly facing rim 70. The upper and central bodies are tightened together, causing both an outer peripheral edge of first diaphragm 20 and the O-ring 104 to be pressed into contact with the rim 70, thereby simultaneously retaining the first diaphragm in the upper body and effecting a liquid and air-tight seal between the upper body 14 and central body 16.

The lower housing body 18 and second diaphragm 22 assembly is connected within the second end 66 of the central housing body 16 by threaded engagement between complementary threads on the outer surface 84 of the lower body sidewall 78 and on the inside surface 74 of the central body collar 72. An O-ring seal 104, identical to that previously described, is interposed between the lower and central housing bodies 18 and 16 to provide a liquid and air-tight seal therebetween.

However, before connecting the lower body and central body together, the spacer 24 is placed onto the frontside surface 94 of the installed second diaphragm 22, with the pressure transfer pad 92 residing within the spacer opening 103. Upon connecting the lower body 18 and central body 16 together, the pressure transfer pad 52 projecting from the first diaphragm 20 is positioned within the spacer opening 103. Alternatively, the upper, central, and lower bodies may be connected together by first assembling together the lower and central bodies, and then inserting the spacer into the annular passage 62 and completing the assembly by connecting together the upper and central bodies. Accordingly, it is to be understood that the method of assembling the double-diaphragm gauge protector is but one example for purposes of illustration.

Tightening the lower and central bodies together causes adjacent surfaces of respective pressure transfer pads 52 and 92 to be placed close to or just into contact with one another. It is desired that, in a finally assembled preferred embodiment, the pressure transfer pads be close to or just contact each other, to prevent imposing a loading force on either of the diaphragms. Such a loading force is undesirable because it could cause a resistance to diaphragm movement that could adversely affect accurate pressure transmission. Accordingly, in a preferred embodiment of the double-diaphragm gauge protector, the axial length of the reduced diameter section 68, and the distance that each transfer pad extends from a respective diaphragm ensures that such loading force is not imposed on the diaphragms. For example, in the above-described preferred embodiment, the axial length of the reduced diameter section 68 is approximately 0.5 inches, and the distance that each transfer pad extends from a respective diaphragm surface is approximately 0.25 inches so that adjacent oppositely positioned ends of each transfer pad just touches one another in the assembled embodiment when not in use.

Additionally, in a preferred embodiment, the spacer 24 is sized so that it rests on the frontside surface of the second diaphragm and does not impose a loading force on adjacent first and second diaphragm surfaces simultaneously when the upper, central and lower housing bodies are assembled together. For example, in the above-described preferred embodiment, the spacer has a height of approximately 0.4 inches and the distance between the frontside surfaces of the first and second diaphragms is approximately 0.5 inches. Therefore, the distance between the spacer and the frontside surface of the first diaphragm is approximately 0.1 inch in the assembled embodiment when not in use.

Once the upper, central and lower housing bodies are assembled, the double-diaphragm gauge protector can be readied for application by installing a desired pressure measuring or sensing device 30 into the pressure outlet port 32. In applications where an on-site indication of process pressure is desired, the pressure measuring device may comprise a conventional pressure gauge, such as a Bourdon-tube type gauge and the like. In applications where an off-site or automated indication of process pressure is desired, e.g., where process pressure is monitored by a computer within a central control room or control station and the like, the pressure measuring device may comprise a pressure transducer.

Once the pressure measuring or sensing device 30 is installed, the upper chamber 29 is filled with a liquid pressure-transfer medium 28 by dispensing the liquid through the filler port 40. Suitable liquid pressure-transfer mediums include water, petroleum based oils, synthetic oils, and the like. Ultimately the type of liquid pressure-transfer medium that is selected will depend on the particular application of the gauge protector. For example, a liquid pressure-transfer medium such as water could be adequate when the gauge protector is installed in a low temperature application. On the other hand, a liquid pressure-transfer medium such as a petroleum based oil such as mineral oil, or synthetic oils such as silicone based oils would be required in high temperature applications, e.g., above 100° C. When used for pressure monitoring in the semiconductor manufacturing industry, in applications involving process fluids such as phosphoric acid and the like at temperatures as high as 180° C., it is desired that the liquid pressure-transfer medium be a high boiling temperature petroleum based or synthetic oil.

During the filling operation, the bleeder plug 39 is removed from the bleeder port 38 to allow air displaced by the entering liquid to escape from the upper chamber. The upper chamber 29 is filled with the desired liquid pressure-transfer medium until the level rises to bleeder port, at which time the bleeder plug is inserted, and until the level of the liquid pressure-transfer medium reaches the filler port 40 and the upper chamber 27 is completely filled. To ensure an approximately one to one pressure transfer from the process fluid to the liquid-pressure transfer medium it is important that any air volume within the upper chamber, including any air volume within the pressure measuring device, be completely displaced by the liquid-pressure transfer medium.

The filler plug 41 is then installed into the filler port to seal the liquid within upper chamber. During the filling operation it is desired that the upper chamber 29 be completely filled with the liquid pressure-transfer medium and that all air bubbles be removed to ensure accurate pressure transfer by the liquid pressure-transfer medium. Air in the upper chamber prevents accurate pressure transfer by the liquid pressure-transfer medium because of its inherent compressibility.

The double-diaphragm gauge protector is installed into its particular application by threaded connection between the process fluid inlet port 82 and a complementary threaded outlet (not shown) of a desired process handling device, such as a pipeline, heat exchanger, pump, reactor vessel, and the like. It is to be understood that, the double-diaphragm gauge protector can be used to measure the pressure of liquids as well as gases.

The double-diaphragm gauge protector, constructed according to principles of this invention, can be used in conjunction with different types of leak detection systems to provide an indication of whether process fluid is leaking from the lower chamber 31 into the central chamber 26, or whether the liquid pressure-transfer medium 28 is leaking from the upper chamber 29 into the central chamber. The ability to detect whether a leak has occurred is desirable particularly in applications, such as the semiconductor manufacturing industry, where strong acids and strong bases are used under conditions of high temperatures where undetected leakage could present both an environmental hazard and possibly a health risk to nearby workers. The leak detection ports 76 are configured to accommodate connection with either internal or external leak detection means. Internal leak detection refers to a leak detection sensor that is installed directly within the leak detection port, while external leak detection refers to a leak detection sensor that is located external from the gauge protector and is connected to the leak detection port by tubing and the like. The type of leak detection means that is selected for use with the gauge protector ultimately depends on the particular application.

During operation, process fluid or gas pressure is allowed to enter the lower chamber 31 and exert a force on the backside surface 95 of the second diaphragm 22, causing the second diaphragm move upwardly toward the first diaphragm 20. As the second diaphragm is moved in an upward direction the pressure transfer pad 92 of the second diaphragm makes contact with the pressure transfer pad 52 of the first diaphragm and displaces the first diaphragm 20 in an upward direction a proportional amount. Further pressure force imposed onto the backside surface 95 of the second diaphragm 22 causes the second diaphragm surface adjacent the spacer 24 to move upwardly, causing the spacer 24 to move in an upward direction and contact the frontside surface 54 of the first diaphragm 20. In a preferred embodiment, the spacer is placed into contact with opposing surfaces of both the first and second diaphragms at a pressure greater than about 70 Psig at ambient temperature, i.e., at less than 100° C. Accordingly, if desired, the gauge protector can be used without the spacer in applications where the process fluid is at ambient temperature and is below 70 Psig and provide accurate pressure transmission.

Increased process pressure causes the spacer 24 to displace the adjacent frontside surface 54 of the first diaphragm 20 in an amount proportional to the displacement of the second diaphragm surface. The spacer serves to prevent the surface of the second diaphragm from deforming an uncontrolled amount or ballooning in response to pressure conditions of greater than approximately 70 Psig. Uncontrolled diaphragm deformation, i.e., ballooning, could both prevent accurate pressure transmitting movement between the first and second diaphragms and cause second diaphragm failure due to rupture by extreme deformation. Use of the spacer, therefore, ensures accurate pressure transmitting movement of the second diaphragm and reduces the potential for second diaphragm failure.

As the first diaphragm 20 is moved upwardly into the upper chamber, by both action of the transfer pad 52 and the spacer 24, the liquid pressure-transfer medium is pressurized by an amount approximately equal to the pressure of the process fluid. The pressure of the liquid pressure-transfer medium is then measured or sensed by the pressure measuring or pressure sensing device 30 attached to the pressure outlet port 32.

Constructed in the manner described above and illustrated in FIGS. 1–6, the double-diaphragm gauge protector accomplishes accurate pressure transmission of a process fluid or gas to a pressure measuring or sensing device without the fear of a diaphragm rupture contamination the process system and causing potentially costly damage to products manufacture by such process. A double-diaphragm gauge protector constructed according to a preferred embodiment of this invention, i.e., having elements formed from PTFE and PFA, can be operated under temperature conditions of up to 180° C. at reduced pressure, and can be operated under pressure conditions of at least 150 Psig at ambient temperature, i.e., under 100° C.

Although limited embodiments of the double-diaphragm gauge protector have been specifically described and illustrated herein, and specific dimensions have been disclosed, many modifications and variations will be apparent to those skilled in the art. For example, embodiments of the double-diaphragm gauge protector that are larger or smaller than that specifically described are understood to be within the scope of this invention. Accordingly, it is to be understood that, within the scope of the appended claims, the double-diaphragm gauge protector according to principles of this invention may be embodied other than as specifically described herein.

What is claimed is:

1. A double-diaphragm gauge protector comprising:
    a diaphragm housing comprising:
        a upper housing body having a pressure outlet port extending though a body wall for accommodating connection with a pressure sensing device;
        a lower housing body having a process fluid inlet port through a body wall for accommodating connection with a fluid handling device; and
        a central housing body having an annular passage therethrough interconnected between the upper and lower housing bodies;
    a first diaphragm disposed within the upper housing body across the annular passage, said first diaphragm having an upwardly facing top surface and a downwardly facing bottom surface, the first diaphragm comprising a transfer pad projecting outwardly from the bottom surface toward the lower housing body;
    a second diaphragm disposed within the lower housing body across the annular passage, said second diaphragm having an upwardly facing top surface and a downwardly facing bottom surface, the second diaphragm comprising a transfer pad projecting outwardly from the top surface toward the first diaphragm, wherein the transfer pads of the first and second diaphragms are positioned facing one another; and
    a free floating spacer disposed within the central housing body and interposed between opposing surfaces of the first and second diaphragms, wherein the transfer pads of both the first and second diaphragm are disposed within a central opening of the spacer.

2. A double-diaphragm gauge protector as recited in claim 1 wherein the upper housing body comprises an inner structure having a recessed portion for accommodating placement of the first diaphragm therein, wherein the recessed portion extends around a sidewall of the inner structure, and wherein the recessed portion has a dimension that is smaller than an outside sidewall dimension of the first diaphragm to provide a radially inward directed circumferential loading on the first diaphragm when installed in the upper housing body.

3. A double-diaphragm gauge protector as recited in claim 1 wherein the lower housing body comprises an inner structure having a recessed portion for accommodating placement of the second diaphragm therein, wherein the recessed portion extends around a sidewall of the inner structure, and wherein the recessed portion has a dimension that is smaller than an outside sidewall dimension of the second diaphragm to provide a radially inward directed circumferential loading on the second diaphragm when installed in the lower housing body.

4. A double-diaphragm gauge protector as recited in claim 1 wherein the upper and lower housing bodies each comprise a threaded outside sidewall surface, wherein the central housing body comprises collar portions at opposite first and second ends having a threaded inner surface to facilitate threaded connection with respective upper and lower housing bodies.

5. A double-diaphragm gauge protector as recited in claim 1 wherein O-ring seals are interposed between adjacent surfaces of the upper housing body and central housing body, and between adjacent surfaces of the lower housing body and the central housing body to provide a liquid and vapor-tight seal therebetween.

6. A double-diaphragm gauge protector as recited in claim 1 wherein the central housing body includes a side wall and at least one leak detection port extends through the sidewall.

7. A double-diaphragm gauge protector as recited in claim 1 wherein the upper housing body comprises:
    an upper chamber defined by an inner structure of the upper housing body and the top surface of the first diaphragm;
    a filler port extending through a body wall of the upper housing body;
    a filler plug disposed within the filler port; and
    a liquid pressure-transfer medium disposed within the upper chamber, wherein the liquid pressure-transfer medium is dispensed into the upper chamber via the filler port.

8. A double-diaphragm gauge protector as recited in claim 1 wherein the upper, central and lower housing bodies, the first and second diaphragms, and the spacer are each formed from similar or different materials selected from the group of fluoropolymeric compounds consisting of polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), and polyvinyl fluoride (PVF).

9. A double-diaphragm gauge protector as recited in claim 1 wherein the spacer is disposed within a central chamber defined central housing body and the first and second diaphragms, and wherein the spacer is freely floating between the first and second diaphragms when the gauge protector is not in use.

10. A double-diaphragm gauge protector as recited in claim 1 wherein the spacer is in simultaneous contact with the bottom and top surfaces of the first and second diaphragms, respectively, to assist the transfer pads in transferring pressure related displacement of the second diaphragm to the first diaphragm when the gauge protector is in use.

11. A double-diaphragm gauge protector comprising:
    a diaphragm housing comprising:
        a upper housing body;
        a lower housing body; and
        a central housing body having an annular passage therethrough interconnected between the upper and lower housing bodies;

a first diaphragm disposed within the upper housing body, wherein the upper housing body has an inside dimension smaller than an outer dimension of the first diaphragm for imposing a radially inward directed circumferential loading force on the first diaphragm, and wherein the first diaphragm includes a centrally located transfer pad that projects outwardly away from a downwardly facing bottom surface of the first diaphragm toward the lower housing body;

a second diaphragm disposed within the lower housing body, wherein the lower housing body has an inside dimension smaller than an outer dimension of the second diaphragm for imposing a radially inward directed circumferential loading force on the second diaphragm, and wherein the second diaphragm includes a centrally located transfer pad projecting outwardly away from an upwardly facing top surface of the second diaphragm toward the first diaphragm, wherein the transfer pads of the first and second diaphragms are positioned facing one another; and a free-floating donut-shaped spacer disposed within the central housing body and interposed between the bottom and top surfaces of the first and second diaphragms, respectively.

12. A double-diaphragm gauge protector as recited in claim 11 wherein the transfer pads of both the first and second diaphragms are disposed within a central opening of the spacer, and wherein the spacer has a height less than a distance between the bottom and top surfaces of the first and second diaphragms, respectively, when the gauge protector is not in use.

13. A double-diaphragm gauge protector as recited in claim 11 wherein the upper housing body comprises:

a pressure outlet port extending through a body wall for accommodating connection with a pressure measuring or pressure sensing device;

an upper chamber defined by an inner structure of the upper housing body and an upwardly facing top surface of the first diaphragm;

a filler port extending through a body wall of the upper housing body;

a filler plug disposed within the filler port; and a liquid pressure-transfer medium disposed within the upper chamber, wherein the liquid pressure-transfer medium is dispensed into the upper chamber via the filler port.

14. A double-diaphragm gauge protector as recited in claim 11 wherein the upper and lower housing bodies each comprise a threaded outside sidewall surface, wherein the central housing body comprises a threaded inner surface and first and second ends to facilitate threaded connection with respective upper and lower housing bodies.

15. A double-diaphragm gauge protector as recited in claim 14 wherein O-ring seals are interposed between adjacent surfaces of the upper housing body and central housing body, and between adjacent surfaces of the lower housing body and the central housing body to provide a liquid and air-tight seal therebetween.

16. A double-diaphragm gauge protector as recited in claim 11 wherein the upper, central and lower housing bodies, the first and second diaphragms, and the spacer are each formed from similar or different materials selected from the group of fluoropolymeric compounds consisting of polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), and polyvinyl fluoride (PVF).

17. A double-diaphragm gauge protector as recited in claim 11 wherein the spacer is in simultaneous contact with bottom and top surfaces of the first and second diaphragms, respectively, to assist the transfer pads in transferring pressure related displacement of the second diaphragm to the first diaphragm when the gauge protector is in use.

18. A double-diaphragm gauge protector as recited in claim 11 wherein the central housing body includes at least one leak detection port extending through a body wall, wherein the leak detection port is configured to accommodate connection with leak detecting means:

19. A double-diaphragm gauge protector as recited in claim 11 wherein the lower housing body comprises:

a process fluid or gas inlet port extending through a body wall for accommodating connection with a process fluid or gas handling device; and a lower chamber defined by an inner structure of the lower housing body and a downwardly facing bottom surface of the second diaphragm, wherein the lower chamber is filled with process fluid or gas when the gauge protector is placed in use.

20. A double-diaphragm gauge protector comprising:

a diaphragm housing comprising:

a upper housing body having a pressure outlet port extending though a body wall for accommodating connection with a pressure measuring or sensing device;

a lower housing body having a process fluid or gas inlet port through a body wall for accommodating connection with a fluid or gas handling device; and a central housing body having an annular passage therethrough interconnected between the upper and lower housing bodies;

a first diaphragm disposed within the upper housing body and forming an upper chamber therebetween, wherein the upper housing body has an inside dimension smaller than an outer dimension of the first diaphragm for imposing a radially inward directed circumferential loading force on the first diaphragm, and wherein the first diaphragm includes a centrally located transfer pad that projects outwardly away from a downwardly facing bottom surface of the first diaphragm toward the lower housing body;

a second diaphragm disposed within the lower housing body and forming a lower chamber therebetween, wherein the lower housing body has an inside dimension smaller than an outer dimension of the second diaphragm for imposing a radially inward directed circumferential loading force on the second diaphragm, and wherein the second diaphragm includes a centrally located transfer pad projecting outwardly away from an upwardly facing top surface of the second diaphragm toward the first diaphragm, wherein the transfer pads of the first and second diaphragms are positioned one on top of the other; and a free-floating donut-shaped spacer disposed within the central housing body and interposed between bottom and top surfaces of the first and second diaphragms, respectively, wherein the transfer pads of both the first and second diaphragm are disposed within a central opening of the spacer.

21. A double-diaphragm gauge protector as recited in claim 20 wherein the spacer is sized to facilitate placement within the central housing body without simultaneously contacting both the bottom and top surfaces of the first and second diaphragms, respectively, when the gauge protector is not in use, and simultaneously contacting both bottom and top surfaces of the first and second diaphragms, respectively, when the gauge protector is in use.

22. A double-diaphragm gauge protector as recited in claim 21 comprising a liquid pressure-transfer medium disposed within the upper chamber.

23. A double-diaphragm gauge protector as recited in claim 22 comprising a process fluid or gas disposed within the lower chamber when the gauge protector is in use.

24. A double-diaphragm gauge protector as recited in claim 23 wherein the upper, central and lower housing bodies, the first and second diaphragms, and the spacer are each formed from similar or different materials selected from the group of fluoropolymeric compounds consisting of polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), and polyvinyl fluoride (PVF).

25. A double-diaphragm gauge protector as recited in claim 24 wherein the first and second diaphragms are formed by machining process from PTFE.

26. A double-diaphragm gauge protector as recited in claim 25 wherein surface portions of the first and second diaphragms have a thickness in the range of from 0.008 to 0.012 inches.

27. A method for accurately transmitting a pressure force from a process fluid or gas outlet to a pressure measuring or sensing device using a gauge protector comprising a first and second diaphragm, the method comprising the steps of:

directing process fluid or gas into a first chamber comprising a second diaphragm;

allowing the process fluid or gas to impose a pressure force against an adjacent surface of the second diaphragm, causing the second diaphragm to move toward a first diaphragm;

transferring the movement of the second diaphragm to the first diaphragm by contacting adjacent first and second diaphragm transfer pads, wherein one transfer pad projects outwardly away from a surface of the second diaphragm opposite the surface in contact with the fluid or gas, and wherein another transfer pad projects outwardly away from a surface of the first diaphragm that faces the second diaphragm, and by contacting remaining facing surface portions of the second and first diaphragms through a free-floating spacer interposed between the diaphragms, wherein the movement of the second diaphragm is transferred to the first diaphragm in a separate second liquid-free chamber; and transferring movement of the first diaphragm to a pressure force within a separate liquid filled third chamber connected to the pressure measuring or sensing device.

28. A method as recited in claim 27 comprising installing the first and second diaphragms in the double-diaphragm gauge protector so that a radially inward directed circumferential force is imposed on each diaphragm.

29. A method as recited in claim 27 comprising sizing the spacer so that it does not simultaneously contact the bottom and top surfaces of the first and second diaphragms, respectively, when the double-diaphragm gauge protector is not in use, and so that it does simultaneously contact the bottom and top surfaces of the first and second diaphragms, respectively when the double-diaphragm gauge protector is in use.

30. A method as recited in claim 27 comprising sizing the transfer pads so that when the double-diaphragm gauge protector is not in use the pads just contact one another.

* * * * *